(12) United States Patent
Liu et al.

(10) Patent No.: US 8,255,934 B2
(45) Date of Patent: Aug. 28, 2012

(54) APPARATUS FOR LOADING DISKS AND ITS METHOD OF ORIENTATING DIFFERENT DISKS

(75) Inventors: Ming-Hsun Liu, Taipei (TW); Chung-Hsuan Tsai, Taipei (TW)

(73) Assignee: Ming-Hsun Liu, Taipei (TW)

( * ) Notice: Subject to any disclaimer, the term of this patent is extended or adjusted under 35 U.S.C. 154(b) by 1399 days.

(21) Appl. No.: 11/626,526

(22) Filed: Jan. 24, 2007

(65) Prior Publication Data

US 2007/0180456 A1 Aug. 2, 2007

(30) Foreign Application Priority Data

Jan. 27, 2006 (TW) ................................ 95103320 A

(51) Int. Cl.
*G11B 17/03* (2006.01)
*B41J 2/01* (2006.01)

(52) U.S. Cl. ......................... 720/604; 720/601; 347/104
(58) Field of Classification Search ........................ None
See application file for complete search history.

(56) References Cited

U.S. PATENT DOCUMENTS

2005/0117947 A1* 6/2005 Shiaku ............................ 400/48
2005/0193398 A1* 9/2005 Lee ................................ 720/603

* cited by examiner

*Primary Examiner* — Matthew Luu
*Assistant Examiner* — Kendrick Liu

(57) ABSTRACT

An apparatus for loading disks and its method of orientating different disks includes housing, a print device, a drawer device, a base with multiple sets of sensor and a transport mechanism. The drawer device includes a disk tray, a driving mechanism, an attaching element, a swing element, an elastic element and a set of disk attachment. The transport mechanism is connected to the drawer device for moving disk tray upon the base. The transport mechanism through a controller automatically controls the various functions of the various components of the drawer device.

2 Claims, 13 Drawing Sheets

APPARATUS FOR LOADING DISKS AND ITS METHOD OF ORIENTATING DIFFERENT DISKS

BACKGROUND OF THE INVENTION

1. Field of the Invention

The present invention relates to an apparatus for loading disks and its method of orientating different disks, and more particularly to an apparatus for loading disks and its method of orientating different disks comprises a rotatable attaching element located at the top of a disk tray of a drawer device and a set of disk attachments, which can fix the disks of different sizes placed at the disk tray of the apparatus for loading disks.

2. Description of the Prior Art

Disks for reading or writing data or video or audio signal with optical media are usually used for copying and storing signal data, including the computer software and other devices.

In general, mass-produced disks are usually made by the method of pressing and continuous printing, and such method is economical only when making thousands of disks together. And it is economical to make hundreds of disks by the method of burning, however, the surfaces of such disks have to be printed with patterns or words via a special print device, or to be stuck with the labels printed with patterns or words.

An ordinary print device is unable to print the disk directly, so a specialized disk-printing device for printing the disks is developed.

A conventional disk-printing device 6 is shown in FIG. 12, which comprises a housing 60, and in a front side of the housing 60 is defined an opening 600 for cooperating with the disk-loading device and an openable front cover 602, facilitating the user to change the print accessory such as an ink box or to solve the obstruction of the print device. In a rear side of the housing 60 is disposed a containing portion 62 for receiving a drawer device of the apparatus for loading disks, and the arrangement of the containing portion 60 will occupy a large space, so the conventional structure is hard to manufacture and transport.

The present invention has arisen to mitigate and/or obviate the afore-described disadvantages.

SUMMARY OF THE INVENTION

The primary objective of the present invention is to provide an apparatus for loading disks and its method of orientating different disks comprises a set of disk attachments and an attaching element disposed on a drawer device for fixing the disks of different sizes to a disk tray of the drawer device, so as to solve the conventional problem of occupying the space and to reduce the cost. In addition, the apparatus for loading disks not only can match with various printers, but also can cooperate with the disks of different shapes and sizes. Thereby, the present invention is very practical.

The further objective of the present invention is to provide an apparatus for loading disks and its method of orientating different disks, the disk tray of the drawer device can be fixed to a housing of a print device by a locking plate when not in use, and it is unnecessary to dispose a protruded containing portion at a rear side of a housing of a print device as described in the prior art, so as to solve the problem of occupying the space and to reduce the cost.

The present invention is to provide an apparatus for loading disks and its method of orientating different disks comprises a drawer device and a base. The drawer device includes a disk tray, a driving mechanism, an attaching element, a swing element, an elastic element and a set of disk attachment. The base is disposed with multiple sets of sensors and a transport mechanism.

The driving mechanism of the drawer device is formed with a blocking edge located correspondingly to the sensors of the base for detecting the position of the disk tray relative to the base. The transport mechanism is pivotally disposed on the base and is located correspondingly to a set of sensors, so as to detect whether the apparatus for loading disks is loaded with a disk or not.

The sensors disposed on the base and a driving apparatus connected to the disk tray are connected to a micro-processor, so as to control the operation of the apparatus for loading disks. The micro-processor is connected to a main computer and serves to transmit electronic signals to the main computer or receive electronic signals sent out from the main computer. The computer software provides a user interface for controlling the apparatus for loading disks.

The attaching element and the swing element of the drawer device are located at the top and bottom of the disk tray respectively, and the attaching element and the swing element are combined together and can be rotated relative to each other. One end of the swing element is pivotally disposed on the base, and the other end of the swing element is formed with a protrusion to be inserted into a blocking edge formed on a front surface of the base and the transport mechanism, so as to detect whether the apparatus for loading disks is loaded with a disk or not. One end of the elastic element is locked in the disk tray, and the other end of the elastic element is abutted against the swing element in such a manner that the swing element and the attaching element can be returned to the original positions after the disk is taken out. On a top surface of the disk attachment is formed an abutting end or an abutting edge, and on a bottom surface of the disk attachment is formed a locking edge for cooperating with the disk tray. The disposition of the disk attachment and the attaching element can be adjusted according to the disks of different shapes and sizes, so as to fix the disks placed at the disk tray of the apparatus for loading disks.

The structures of the attaching element and the disk attachments of the present invention are designed according to the disks of different shapes and sizes (such as a circular disk with a diameter of 80 mm or 120 mm, or card-shaped disks), and as compared to the conventional apparatus for loading disks, the apparatus for loading disks of the present invention is more practical.

The disk attachment of a first embodiment of the present invention is made of two oval-shaped pieces, both ends of a top surface of each piece are formed with an abutting end having a protrusion and a plane end, and in the bottom surface of the piece is formed a locking edge for cooperating with the disk tray.

The disk attachment of a second embodiment of the present invention is a strip-shaped piece and both ends are expanded symmetrically, and both sides of the piece are formed with abutting edges for cooperating with the card-shaped disks of different sides respectively. On the bottom surface of the piece is formed a locking edge and a pivoting post for cooperating with the disk tray.

The drawer device and the base are disposed in the housing of a print device, and in a front side and a rear side of the housing is defined with an opening located correspondingly to the disk tray of the drawer device. Near the opening of the rear side of the housing is formed a set of opposite groove edges, and between the groove edges is disposed a locking plate located correspondingly to the disk tray. In this case, the disk tray of the drawer device will be fixed to the housing by the locking plate, so as to solve the problem of occupying the space and to reduce the cost.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1A:
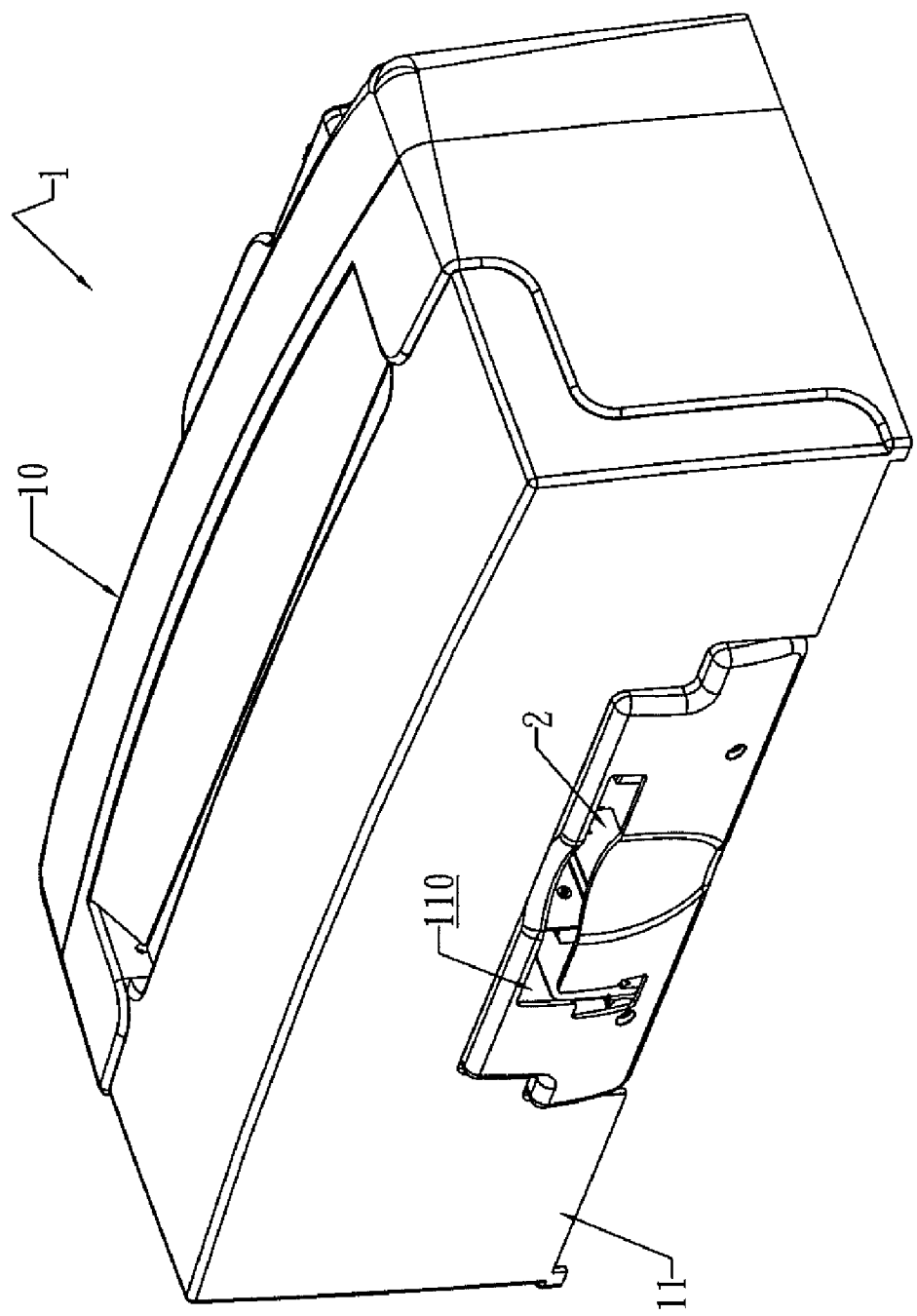
FIGS. 1A and 1B are perspective views of an apparatus for loading disks and its method of orientating different disks in accordance with the present invention.
Figure 1B:
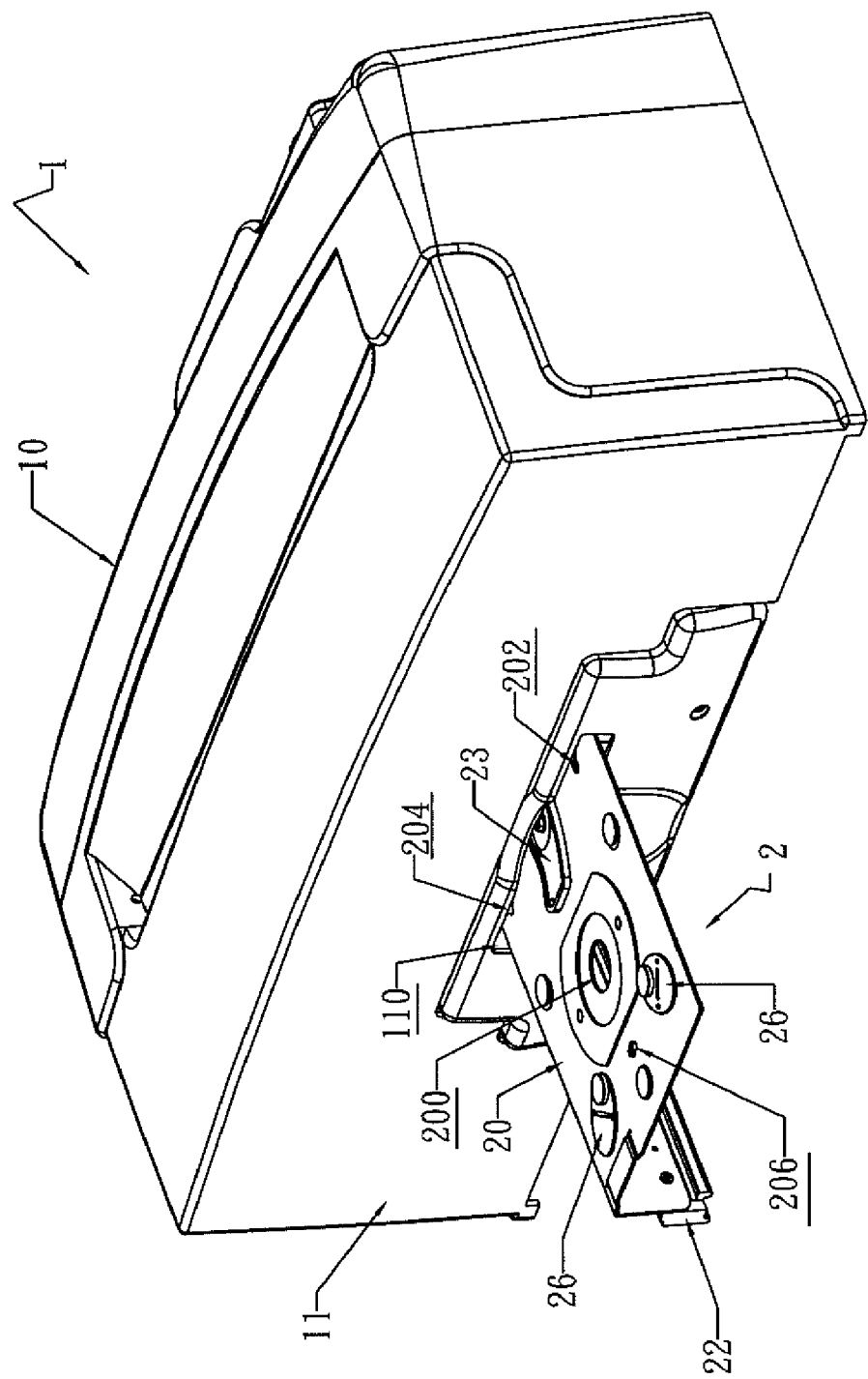
Figure 2A:
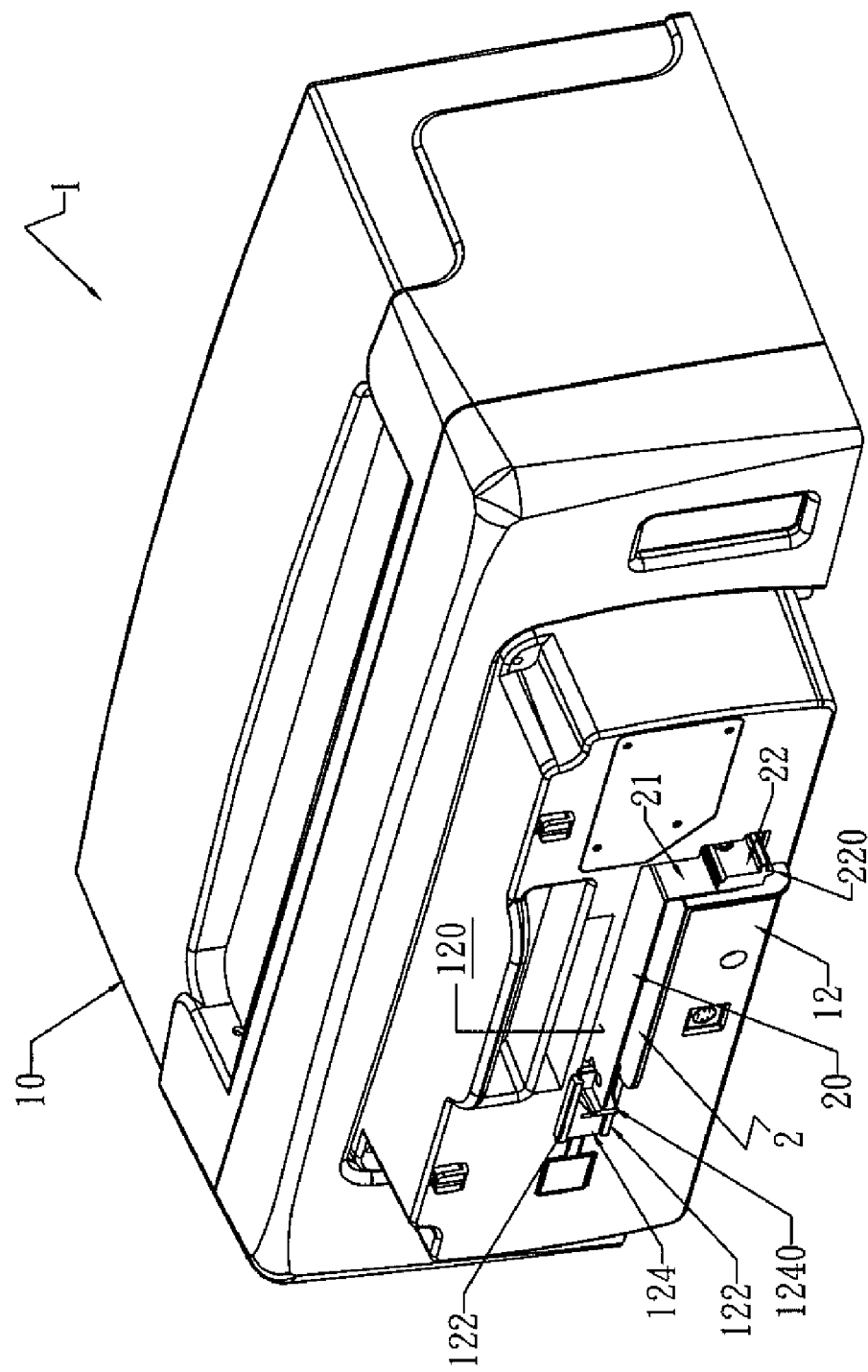
FIGS. 2A and 2B are perspective views of the apparatus for loading disks and its method of orientating different disks in accordance with the present invention.
Figure 2B:
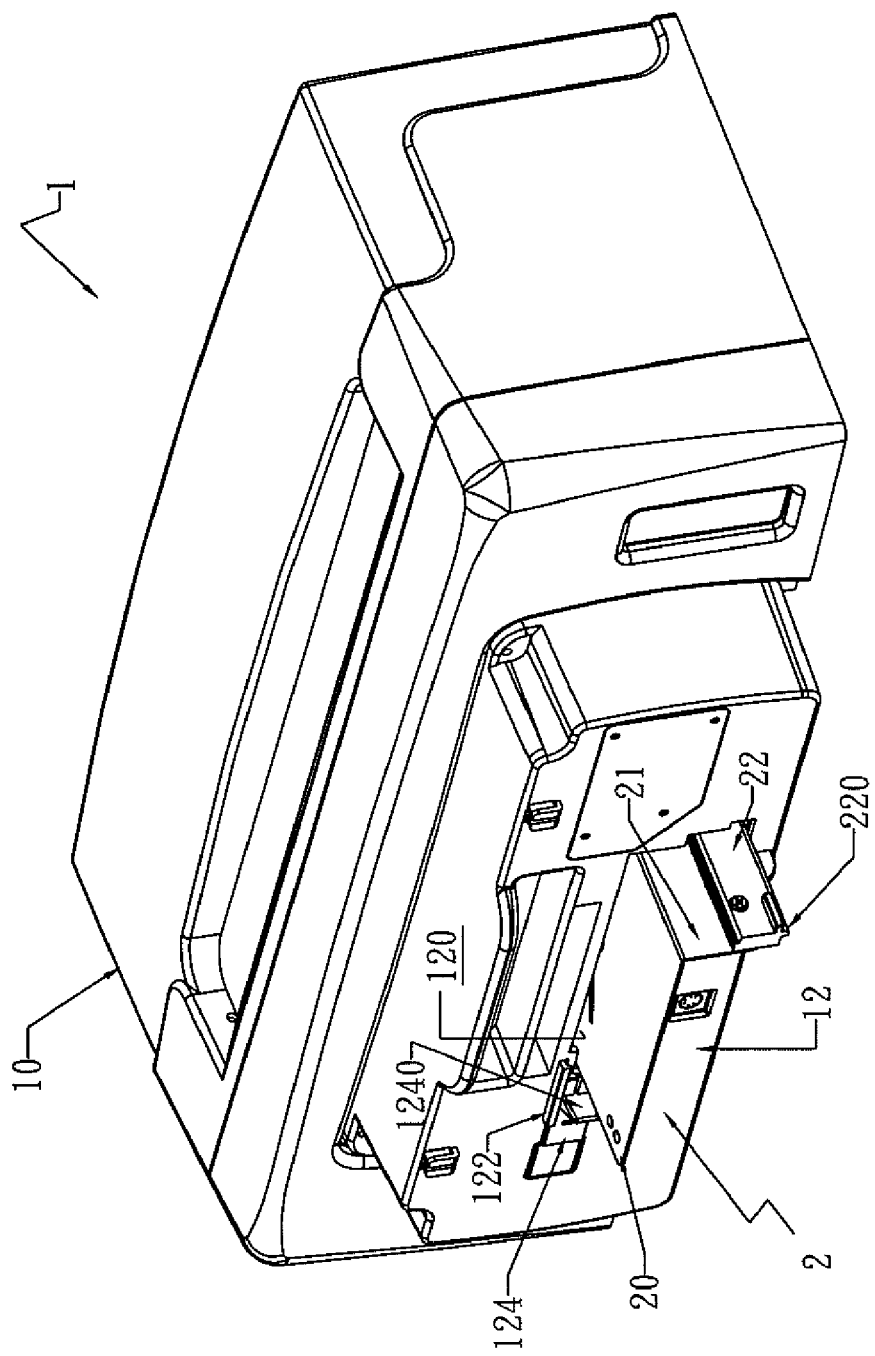

The present invention relates to an apparatus for loading disks and its method of orientating different disks, and more particularly to an apparatus for loading disks and its method of orientating different disks comprises a rotatable attaching element located at the top of a disk tray of a drawer device and a set of disk attachments, which can fix the disks of different sizes placed at the disk tray of the apparatus for loading disks.

Referring to FIGS. 1A-2B, an apparatus for loading disks in accordance with the present invention is disposed in a print device 1, and the print device 1 has a housing 10. In the housing 10 is disposed a disk-printing element that can print pattern on a blank disk directly, and a micro-processor is connected to the apparatus for loading disks for controlling the operation of the apparatus for loading disks. The microprocessor can be connected to a main computer and serves to transmit electronic signals to the main computer or receive electronic signals sent out from the main computer. The computer software provides a user interface for controlling the disk-printing element and the apparatus for loading disks, and the disk-printing element is not restricted to any factory brand.

The housing 10 has a key (not shown) and an openable cover (not shown), facilitating the user to change the print accessory such as an ink box or to solve the obstruction of the print device. The housing 10 is defined with openings 110 and 120 in a front side 11 and a rear side 12 thereof respectively, enabling the apparatus for loading disks to extend out of the housing 10 during the operation. Near the opening 120 of the rear side 12 of the housing 10 is formed a set of groove edges 122 extending towards the opening 120, and between the groove edges 122 is disposed a locking plate 124 for fixing the drawer device 2 of the apparatus for loading disks. The locking plate 124 is formed with a pushing portion 1240, and the housing 10 and the locking plate 124 can be made of the same material or the different materials manufactured by modular methods, such that the cost is reduced effectively.

Further, a disk tray 20 of the drawer device 2 can be fixed in the housing 10 by the locking plate 124 when not in use, and it is unnecessary to dispose a protruded containing portion 62 at a rear side of a housing 60 of a print device 6 as described in the prior art, so as to solve the conventional problem of occupying the space and to reduce the cost.

Figure 3:
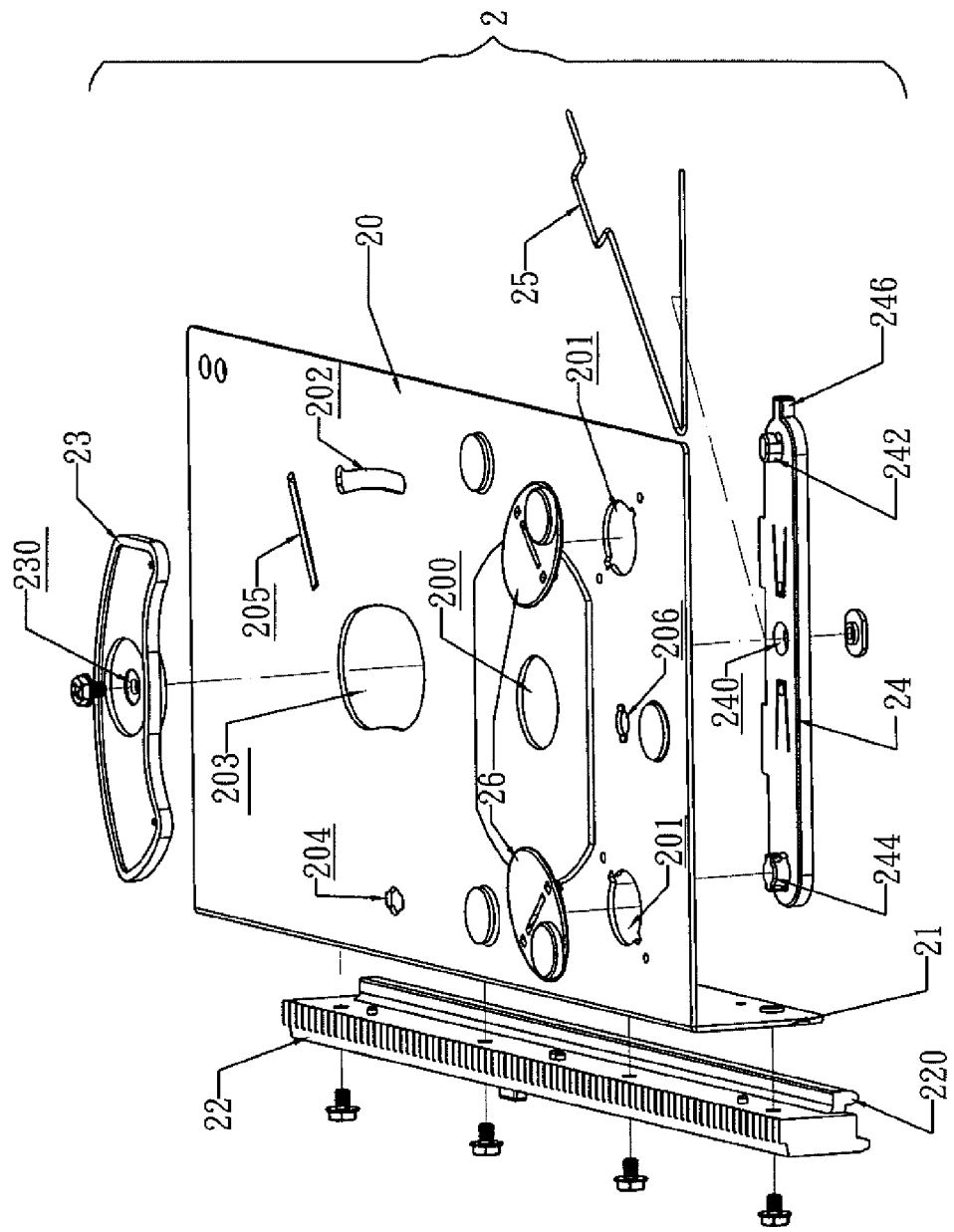
FIG. 3 is an exploded view of an apparatus for loading disks in accordance with the present invention.
Figure 4:
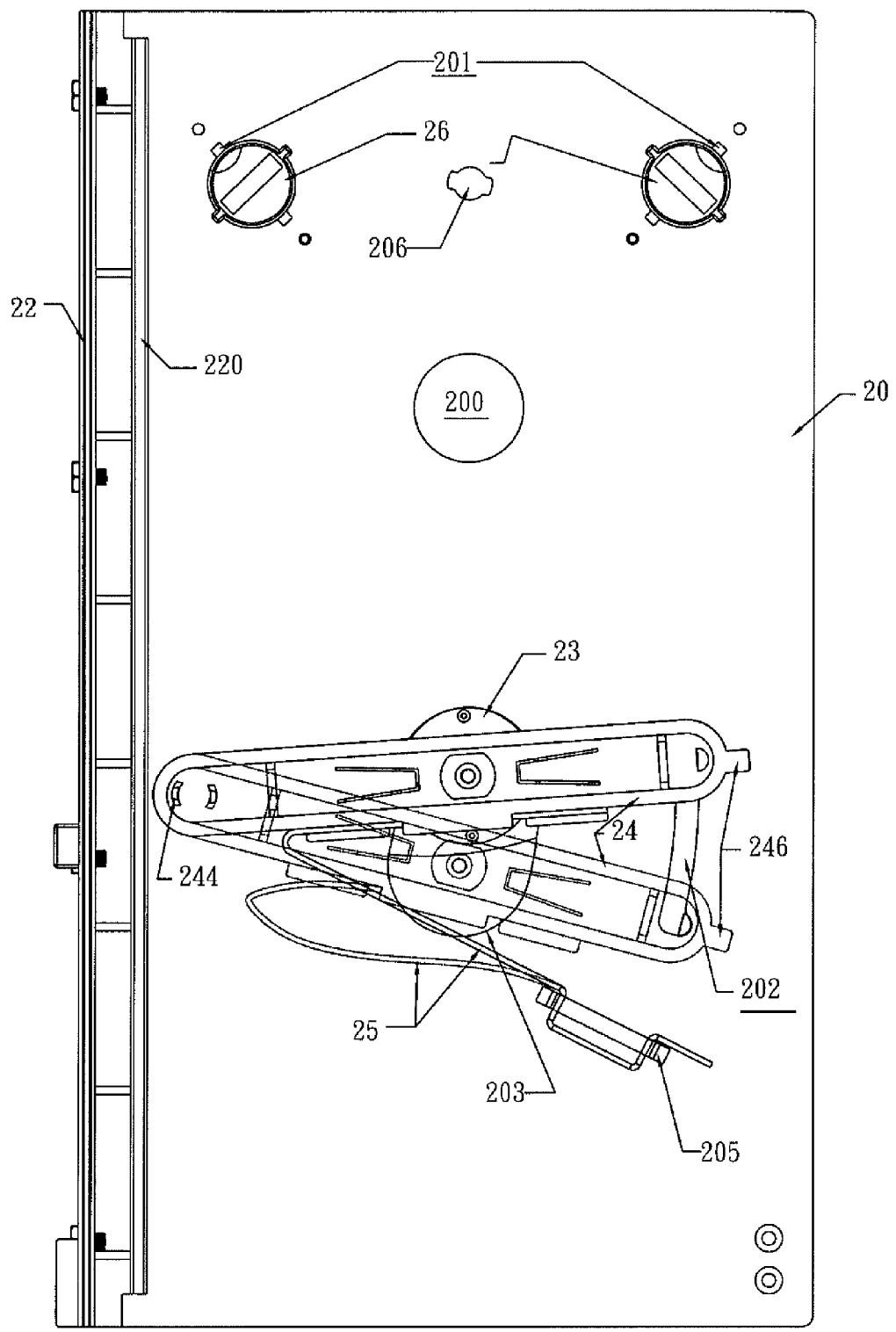
FIG. 4 is an assembly view of the apparatus for loading disks in accordance with the present invention.
Figure 5B:
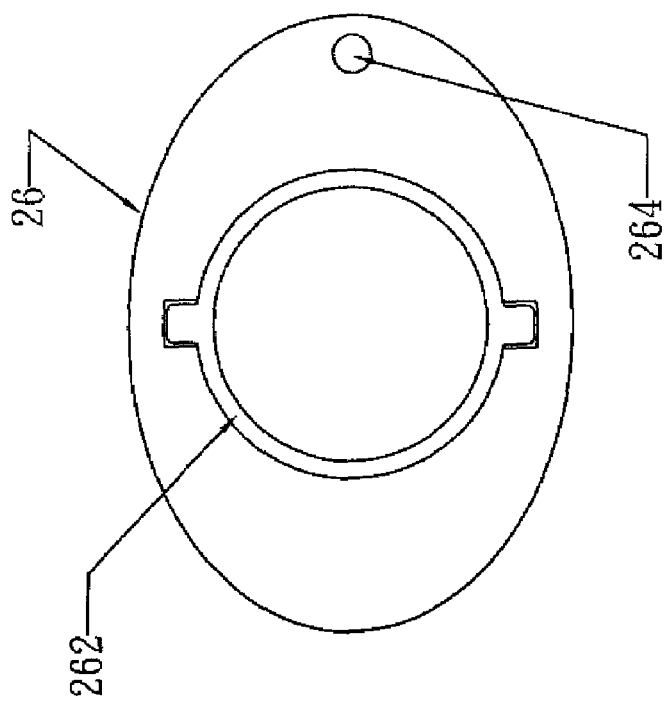
FIGS. 5A and 5B are illustrative views of a disk attachment in accordance with a first embodiment of the present invention.
Figure 5A:
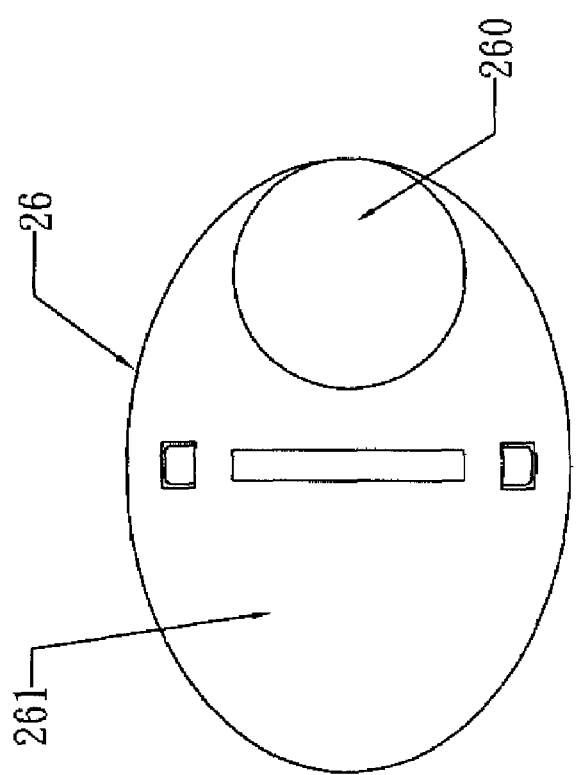
Figure 6:
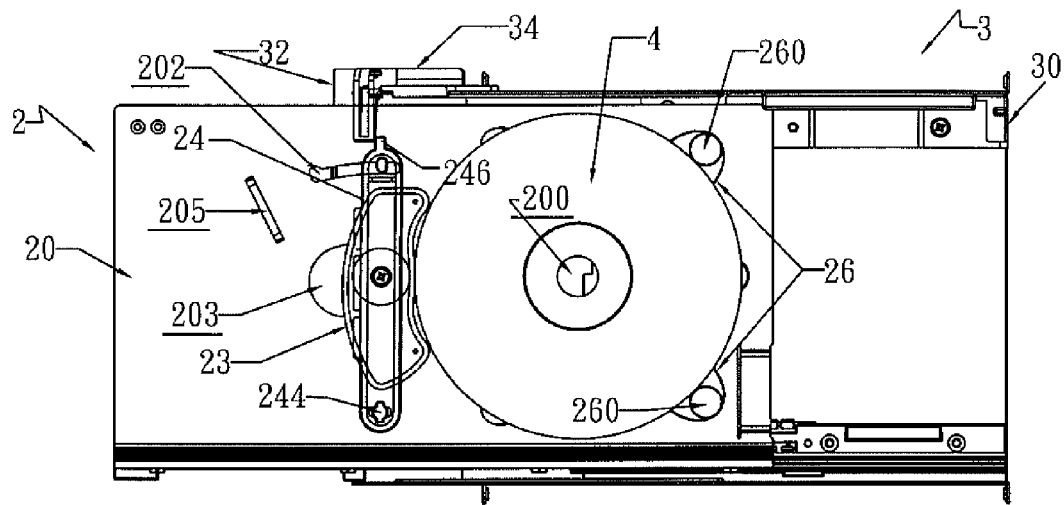
FIGS. 6 and 7 are illustrative views of the disk attachment in accordance with the first embodiment of the present invention.
Figure 7:
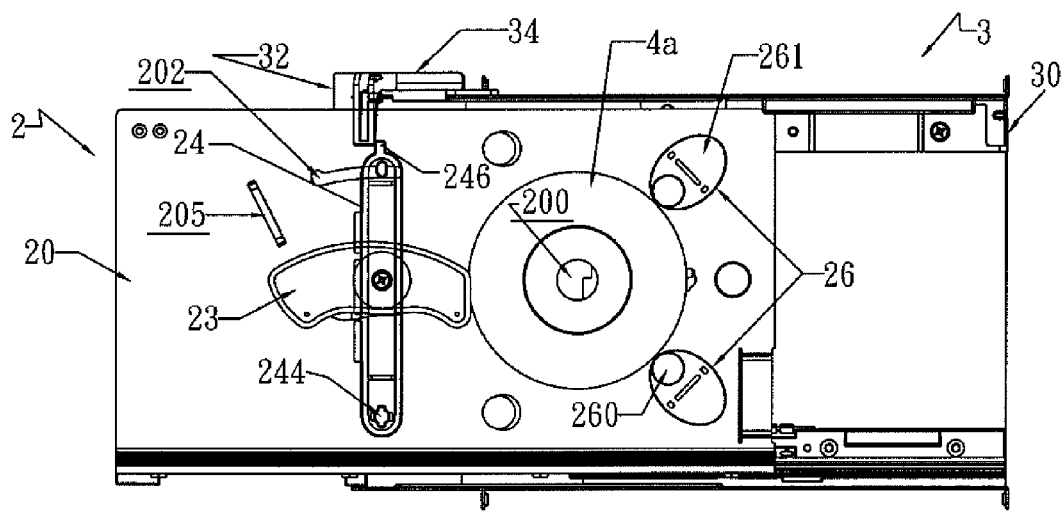
Figure 8A:
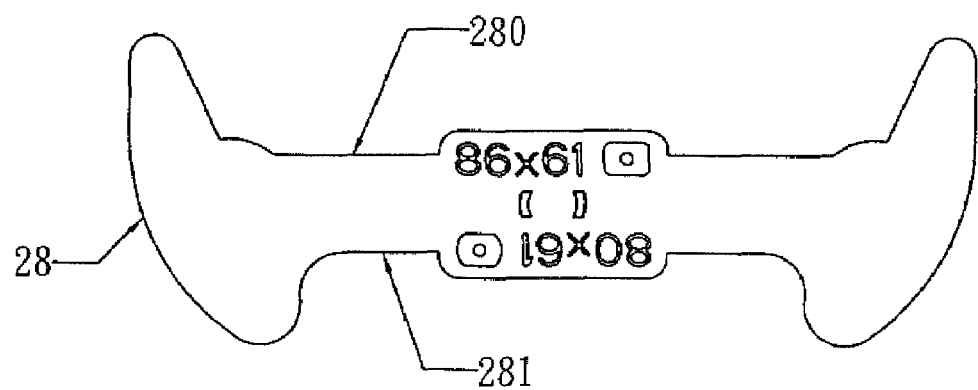
FIGS. 8A and 8B are illustrative views of a disk attachment in accordance with a second embodiment of the present invention.
Figure 8B:
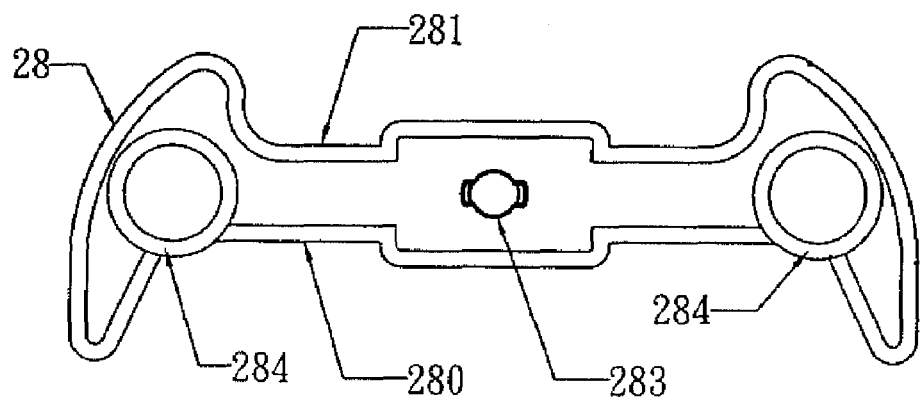
Figure 9:
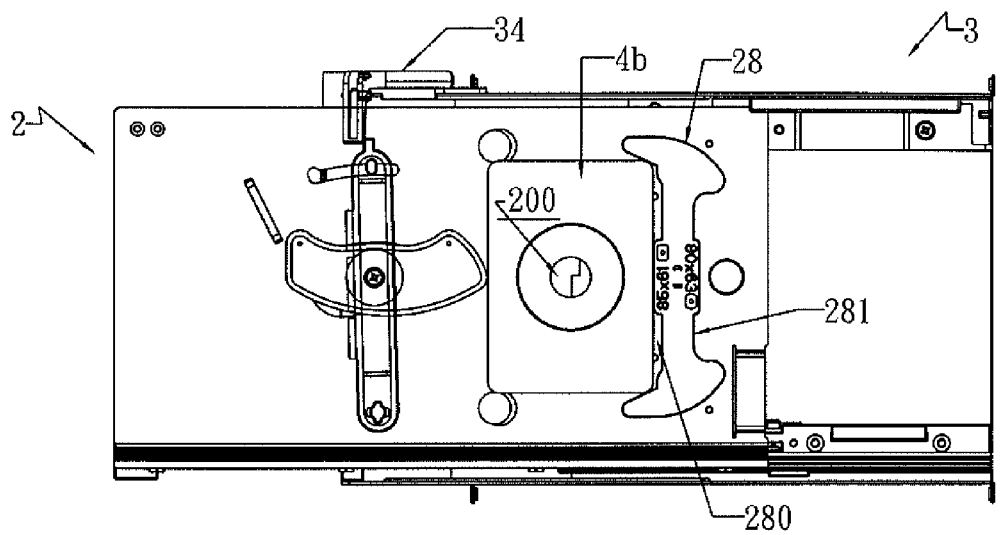
FIGS. 9 and 10 are illustrative views of the disk attachment in accordance with the second embodiment of the present invention.
Figure 10:
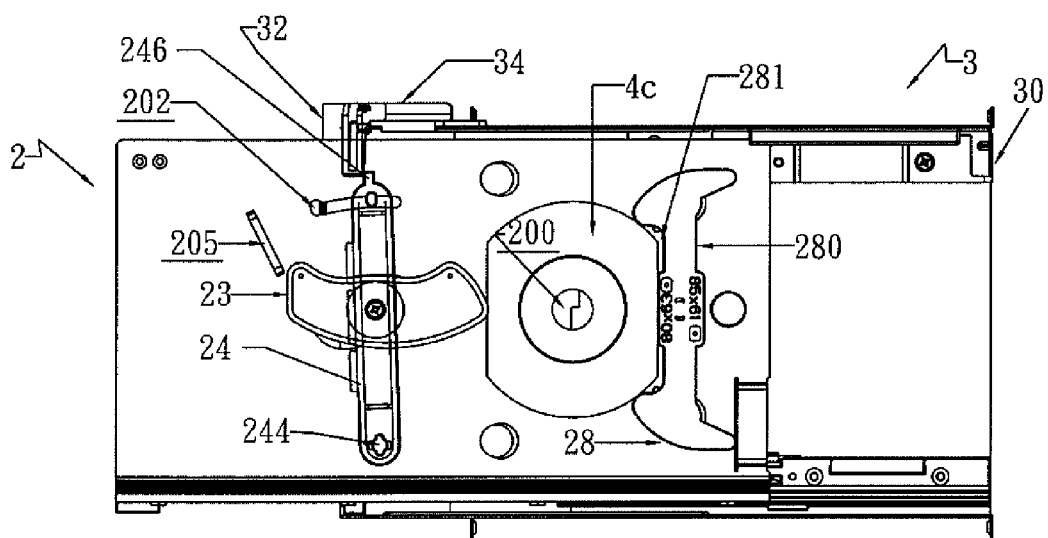

With reference to FIG. 3 and further referring to FIGS. 4, 6, 7 and 11 A, the apparatus for loading disks of the present invention comprises a drawer device 2 and a base 3, multiple sets of sensors a, a', b, b', c, c' are disposed on the base 3, and the drawer device 2 can be moved back and forth along the base 3.

The drawer device 2 includes a disk tray 20, a driving mechanism 22, an attaching element 23, a swing element 24 and an elastic element 25. The driving mechanism 22 is disposed at one side of the disk tray 20 for enabling the disk tray 20 to move back and forth along the base 3.

The base 3 is disposed with multiple sets of sensors a, a', b, b', c, c' and a transport mechanism 34. The driving mechanism 22 is formed with a blocking edge 220 located correspondingly to the sensors a, a', b, b' for detecting the position of the disk tray 20 relative to the base 3.

The attaching element 23 and the swing element 24 are located at the top and bottom of the disk tray 20 respectively, and the attaching element 23 and the swing element 24 are combined together and can be rotated relative to each other. In the present embodiment, the attaching element 23 and the swing element 24 are combined together via through holes 230 and 240 of the attaching element 23 and the swing element 24 by a screw, and the attaching element 23 and the swing element 24 also can be rotatably combined together by other methods (such as rivet jointing or locking).

The structure of the attaching element 23 is designed according to the disks of different shapes and sizes (such as a circular disk with a diameter of 80 mm or 120 mm, or card-shaped disks), and as compared to the conventional apparatus for loading disks, the apparatus for loading disks of the present invention is more practical. And referring to FIGS. 5-10, on the disk tray 20 corresponding to the position of the disk is disposed disk attachments 26 and 28 for fixing the disk. For printing the disks of different shapes, it is only needed to change the disk attachments 26 and 28 and to rotate the attaching element 23 to clip the disk, and then printing can be carried out. Moreover, the disk attachments 26 and 28 are easy to change, and really can fix the disks of different shapes and sizes by cooperating with the attaching element 23.

An extending piece 21 extends from one side of the disk tray 20 for connecting with the driving mechanism 22, and the disk tray 20 further includes an arc-shaped sliding groove 202, two pivoting holes 204, 206 and a locking groove 205. One end of the swing element 24 is formed with a pivoting post 244 to be inserted into the pivoting hole 204 of the disk tray 20, and the other end of the swing element 24 is formed with a protruded post 242 and a protrusion 246. The protruded post 242 is to be inserted in the sliding groove 202 of the disk tray 20, the protrusion 246 is to be abutted against a blocking edge 31 formed on a front surface 30 of the base 3 and the transport mechanism 34 disposed near a rear surface 32 of the base 3. One end of the elastic element 25 is locked in the locking groove 205 of the disk tray 20, and the other end of the elastic element 25 is abutted against the swing element 24 in such a manner that the swing element 24 and the attaching element 23 can be returned to the original positions after the disk is taken out. The transport mechanism 34 has a pivoting point 340 and a blocking edge 342 located correspondingly to the sensors C, C'. When the protrusion 246 of the swing element 24 touches the transport mechanism 34, the blocking edge 342 of the transport mechanism 34 will block or connect the sensors c, c' to send out different signals, so as to detect whether the disk tray 20 is loaded with a disk or not.

FIGS. 5A, 5B, 6 and 7 are illustrative views of the disk attachment 26 in accordance with a first embodiment of the present invention. The disk attachment 26 is made of two oval-shaped pieces, both ends of a top surface of the disk attachment 26 are formed with an abutting end 260 having circular protrusion and a plane end 261, and in an intermediate portion of the bottom surface of the disk attachment 26 is formed a locking edge 262 for cooperating with a locking hole 201 of the disk tray 20. For printing the circular disks 4, 4a of different diameters of 120 mm or 80 mm, it is only needed to adjust the direction of the disk attachment 26, enabling the abutting ends 260 or the plane ends 261 of the disk attachment 26 to toward to the outside simultaneously, and to rotate the attaching element 23 to clip the disks 4, 4a, and then printing can be carried out. Moreover, the disk attachments 26 is easy to adjust, and really can fix the disks of different shapes and sizes by cooperating with the attaching element 23.

FIGS. 8A, 8B, 9 and 10 are illustrative views of the disk attachment 28 in accordance with a second embodiment of the present invention. The disk attachment 28 is a strip-shaped piece and both ends are expanded symmetrically, and both sides of the disk attachment 28 are formed with abutting edges 280 and 281 for cooperating with the card-shaped disks 4b, 4c of different sides respectively. In an intermediate portion of the bottom surface of the disk attachment 28 is formed a pivoting post 283 for cooperating with the pivoting hole 206 of the disk tray 20, and near each end of the disk attachment 28 is formed a locking edge 284 for cooperating with the locking hole 201 of the disk tray 20. For printing the card-shaped disks 4b and 4c of different shapes, it is only needed to rotate the disk attachment 28 for 180 degrees, enabling the abutting edges 280 and 281 of the disk attachment 28 to abut against the sides of the card-shaped disk 4b and 4c, and to rotate the attaching element 23 to clip the disks, and then printing can be carried out. Moreover, the disk attachments 28 is easy to adjust, and really can fix the disks of different shapes and sizes by cooperating with the attaching element 23.

Figure 11A:
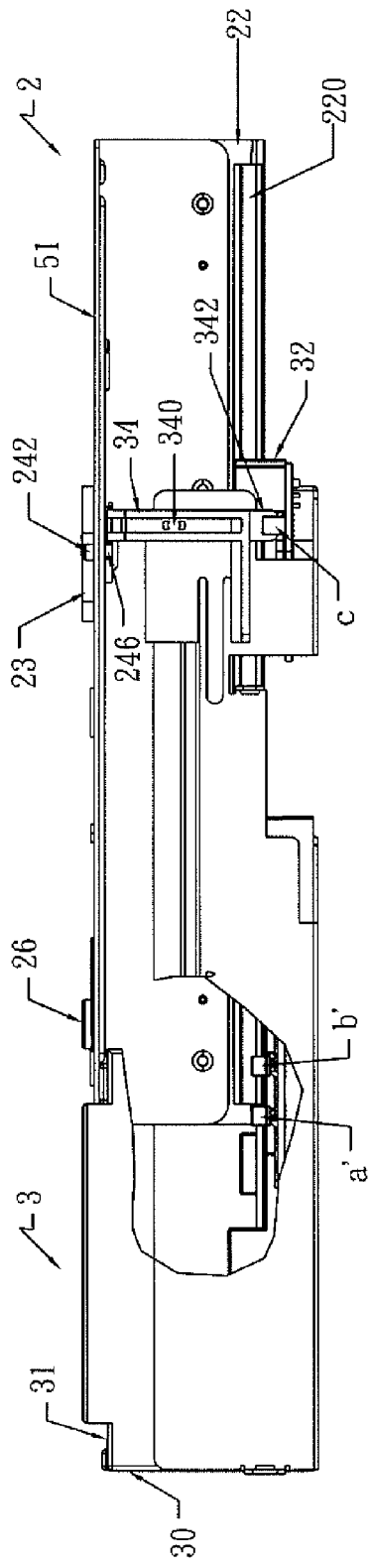
FIGS. 11A-11D are illustrative views of the apparatus for loading disks in accordance with the present invention.

Referring to FIG. 11A, as can be clearly seen from FIG. 11A that when the drawer device 2 with no disk is pushed towards the rear side 12 of the housing 10 relative to the base 3, the swing element 24 and the attaching element 23 will be fixed and will not push the transport mechanism 34 disposed near the rear surface 32 of the base 3 by the restriction of the elastic element 25, the protruded post 242 and the sliding groove 202. In this case, the blocking edge 342 of the transport mechanism 34 will block or connect the sensors c, c' to send out different signals, and to show that the disk tray 20 is not placed with the disk 4.

Figure 11B:
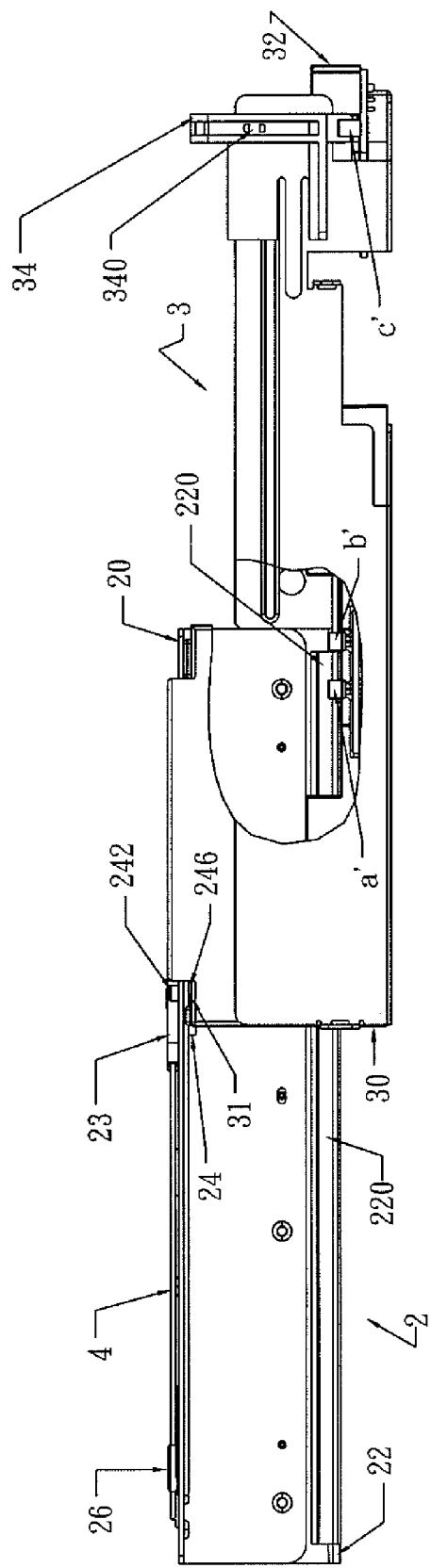

Referring to FIG. 11B, when the drawer device 2 is pushed from the opening 110 of the front side 11 of the housing 10 and is placed with the disk 4, the attaching element 23 and the swing element 24 will be inward deviated to the inner side of the housing 10 along the sliding groove 202. And the disk 4 can be clipped and fixed to the disk tray 20 of the drawer device 2 by the elastic element 25.

The relative positions of the disk tray 20 of the drawer device 2 and the base 3 in different conditions is shown in FIGS. 11A-11D, the blocking edge 220 of the driving mechanism 22 is provided for blocking or connecting the sensors a, a', b, b' of the base 3 to send out different signals, so as to detect the position of the disk tray 20. In addition, the blocking edge 342 of the transport mechanism 34 can block or connect the sensors c, c' to send out different signals, so as to detect whether the disk tray 20 is loaded with the disk 4 or not.

FIG. 11B shows the relative position of the blocking edge 220 of the driving mechanism 22 and the sensors a, a', b, by of the base 3, and the relative position of the protrusion 246 of the swing element 24 disposed at the bottom of the disk tray 20 and the blocking edge 31 of the front surface 30 of the base 3 when the drawer device 2 is protruded out of the housing 10.

Figure 11C:
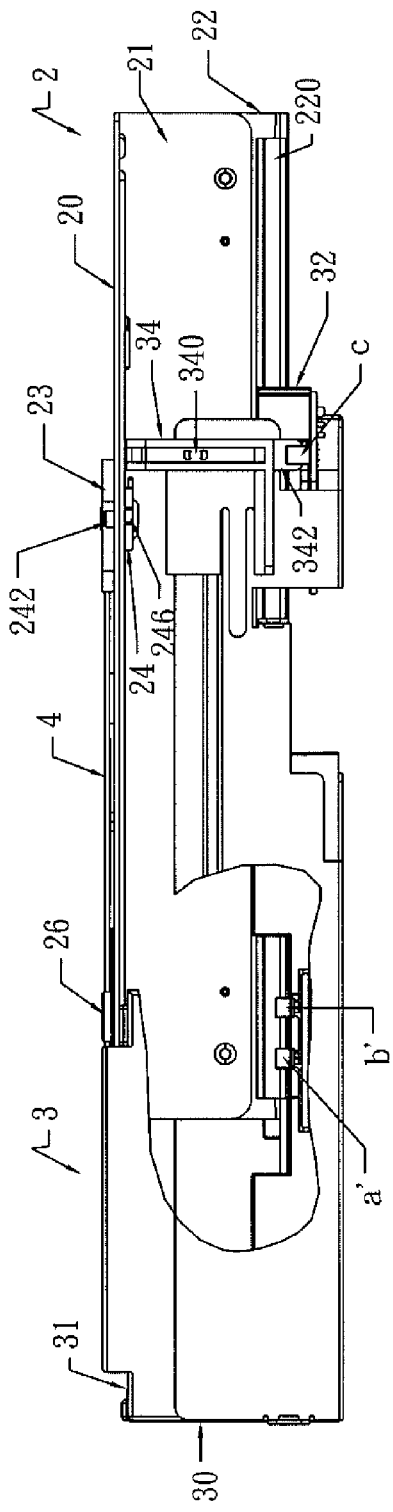

FIG. 11C shows the relative position of the blocking edge 220 of the driving mechanism 22 and the sensors a, a', b, b' of the base 3, and the relative position of the transport mechanism 34 disposed near the rear surface 32 of the base 3 and the sensors c, c' of the base when the drawer device 2 placed with the disk moves into the housing 10.

Figure 11D:
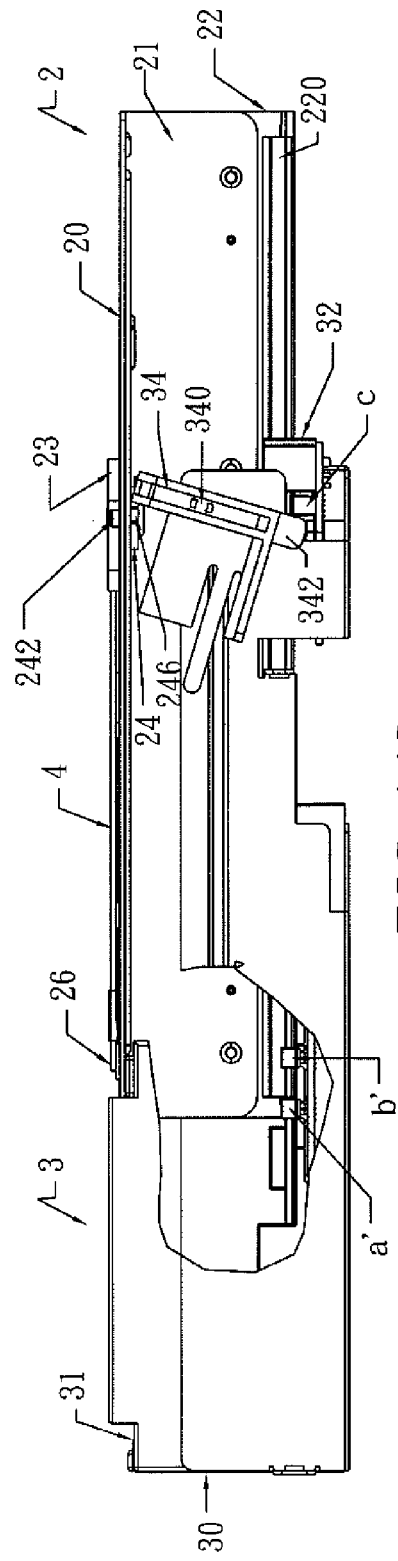
Figure 12:
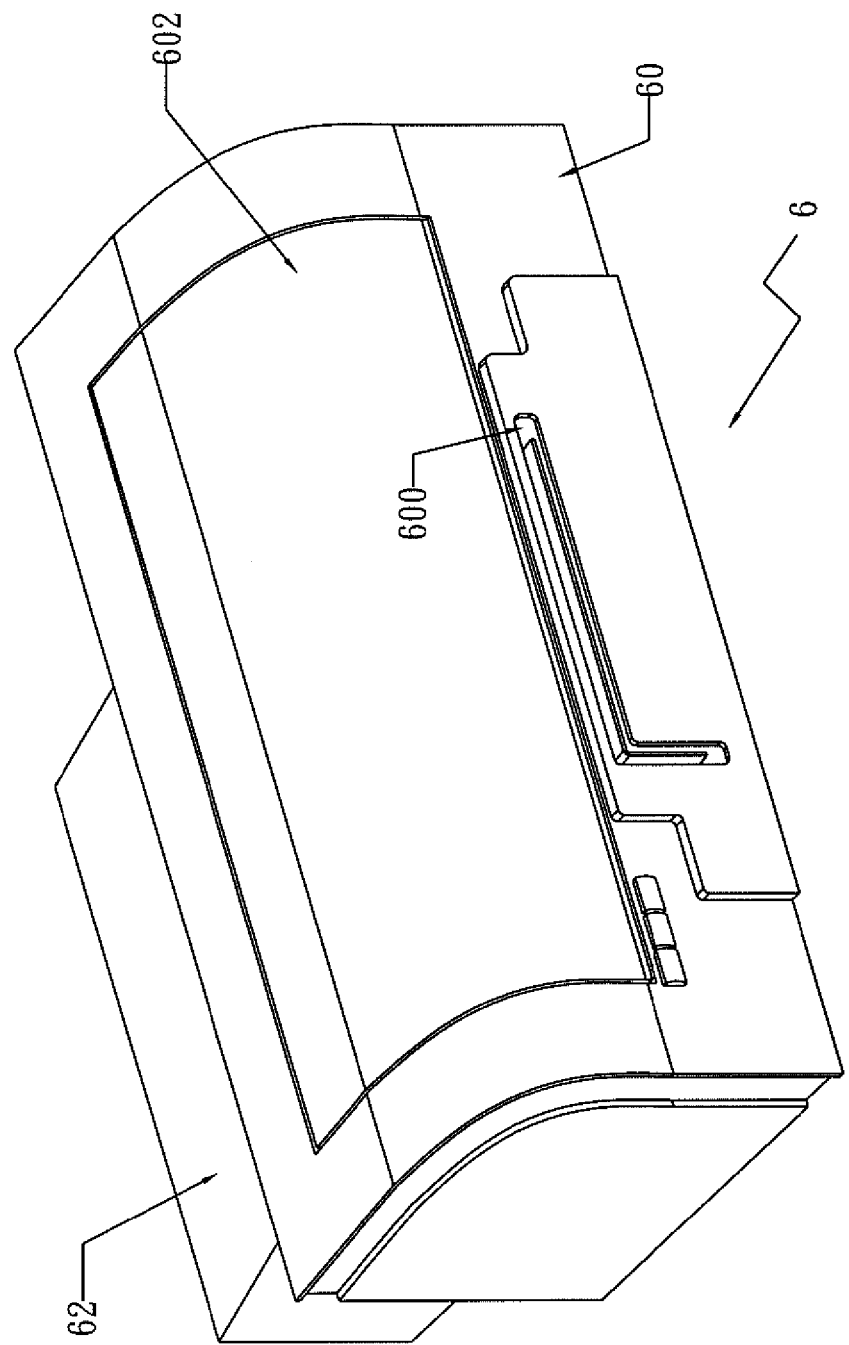
FIG. 12 is a perspective view of a conventional print device.

Referring to FIGS. 11A and 11D, when the drawer device 2 loaded with the disk 4 is pushed from the opening 120 of the rear side 12, the protrusion 246 of the swing element 24 disposed at the bottom of the disk tray 20 will push the transport mechanism 34 disposed near the rear surface 32 of the base 3. The blocking edge 220 of the driving mechanism 22 will connect the sensors a, a', b, b' of the base 3 to send out different signals, so as to show the direction of pushing the disk tray 20. Further, the protrusion 246 of the swing element 24 disposed at the bottom of the disk tray 20 will push the transport mechanism 34, such that the blocking edge 342 of the transport mechanism 34 will block or connect the sensors c, c' to send out different signals, so as to show that the disk tray 20 is loaded with the disk 4.

While we have shown and described various embodiments in accordance with the present invention, it should be clear to those skilled in the art that further embodiments may be made without departing from the scope of the present invention.

What is claimed is:

1. An apparatus for orientating different disks comprising: a drawer device and a base, the drawer device includes a disk tray, a driving mechanism, an attaching element, a swing element, an elastic element and a set of disk attachment, and the base is disposed with multiple sets of sensors and a transport mechanism, wherein:

the attaching element and the swing element are located at top and bottom of the disk tray respectively, the attaching element and the swing element are combined together and are rotated relative to each other;

one end of the swing element is pivotally disposed on the base, the other end of the swing element is formed with a protrusion to be inserted into a blocking edge formed on a front surface of the base and the transport mechanism, so as to detect whether an apparatus for loading disks is loaded with a disk or not;

one end of the elastic element is locked in the disk tray, the other end of the elastic element is abutted against the swing element in such a manner that the swing element and the attaching element are returned to the original positions after the disk is taken out;

on a top surface of the disk attachment is formed an abutting end or an abutting edge, on a bottom surface of the disk attachment is formed a locking edge for cooperating with the disk tray; and the disposition of the disk attachment and the attaching element are adjusted according to disks of different shapes and sizes, so as to fix the disks placed at the disk tray of the apparatus for loading disks.

2. The apparatus for orientating different disks as claimed in claim 1, wherein the disk tray is defined with two locking holes located correspondingly to the position of the disk, the disk attachment is made of two oval-shaped pieces, both ends of a top surface of each piece are formed with an abutting end having a protrusion and a plane end, and on a bottom surface of the piece is formed a locking edge for cooperating with the locking hole of the disk tray.

* * * * *